United States Patent [19]

Nojima et al.

[11] Patent Number: 5,204,571
[45] Date of Patent: Apr. 20, 1993

[54] MINIATURE ELECTRIC MOTOR WITH RUBBER STATOR MAGNET

[75] Inventors: Yukako Nojima, Kyoto; Shigenori Uda, Osaka; Hiromi Suyama, Tottori; Masanori Onda, Yonago, all of Japan

[73] Assignee: Matsushita Electric Industrial Co., Ltd., Kadoma, Japan

[21] Appl. No.: 703,263

[22] Filed: May 22, 1991

[30] Foreign Application Priority Data

Jul. 13, 1990 [JP] Japan .................................. 2-186534

[51] Int. Cl.⁵ .......................... H02K 1/17; H01F 3/02; H01F 7/02
[52] U.S. Cl. ............................. 310/156; 310/40 MM; 335/303
[58] Field of Search ................. 310/40 MM, 152, 156, 310/254, 257; 335/302, 303

[56] References Cited

U.S. PATENT DOCUMENTS

| 3,131,462 | 5/1964 | Owings et al. | 335/303 |
| 3,257,586 | 6/1966 | Steingroever | 335/303 |
| 3,904,902 | 9/1975 | Inariba | 310/162 |
| 4,052,630 | 10/1977 | Inariba | 310/162 |
| 4,748,361 | 5/1988 | Ohnishi et al. | 310/156 |
| 5,063,367 | 11/1991 | Lee | 335/284 |

Primary Examiner—Steven L. Stephan
Assistant Examiner—D. R. Haszko
Attorney, Agent, or Firm—Cushman, Darby & Cushman

[57] ABSTRACT

A miniature electric motor having a stator composed of a strip of rubber magnet having a varying width. The stator strip has; polarized regions of wide width, non-polarized regions of narrow width, and regions which bridge said polarized regions having a continuously varying width. The periphery of the polarized and non-polarized regions of the stator strip contains indents and protrusions to improve the cogging characteristics of the motor.

4 Claims, 3 Drawing Sheets

MINIATURE ELECTRIC MOTOR WITH RUBBER STATOR MAGNET

BACKGROUND OF THE INVENTION

1. Field of the Invention

The present invention relates to a miniature electric motor (fractional horse-power motor or fractional wattage motor) of a type used to drive an audio or video tape recorder, for example, with a stator comprised of a rubber magnet.

2. Background Information

There are basically two conventional manners of assembling the stators of the conventional miniature electric motor. One method, exemplified in FIG. 4(a), is to arrange two separate pole pieces made of a rubber magnet each having a section of "C" configuration, along an inner circumference of a motor housing. Alternatively, in FIG. 4(b), the stator is structured by forming a circular stator from a rectangular strip of a rubber magnet to conform to the entire curvature of the inner circumference of the motor housing. Once placed inside the housing, the strip is polarized under predetermined conditions.

Of the above-mentioned arrangements, the latter conventional example is the more frequently and widely employed because of the simplicity of the assembly process and low manufacturing cost. The efficiencies of this design, however, are not realized in the case where the whole motor configuration is restricted an elliptical shape or the like.

The stator structured with two pole pieces made of a rubber magnet with sections of "C" configuration is advantageous in that it requires only a small amount of rubber magnet. It however has drawbacks because it entails a complex assembly process which may sometimes require a long time for adhering and fixing the magnet pieces to the inner circumference of the motor housing. Also, the motor may have a high defect rate due to possible separation of the once fixed rubber magnet pieces.

The rectangular rubber magnet strip of the alternative design has the advantage that the strip can easily be held in the motor housing and can be assembled in the housing in a short time period because the strip closely contacts the entire inner circumference of the housing. The rectangular rubber magnet strip however has a drawback because the housing must hold a circular long strip of magnet including non-polarized parts which occupy spaces which could otherwise be spared. Another disadvantage is caused by the hardness or brittleness inherent to the rubber magnet material which may sometimes adversely affect the characteristics of the motor itself. The joining edges of the rectangular strip may sometimes lift slightly from the inner circumference of the housing. This defect will cause the motor to be rejected due to the strict standard applied in the manufacturing control of such miniature motors. Strict standards apply; for instance, to the uneven gap or clearance between the stator and the rotor.

In addition, the polarizing process itself also imposes an unsolved problem of designing the shape of a polarizing yoke, because the shape of the polarizing yoke has a serious influence on the maximum torque and the cogging characteristics of the finished motor. This problem would require a long time period to conduct experiments and evaluate the experimental results.

Apart from this, the necessity for reducing the cogging characteristics of such a miniature motor has been recognized and some improvements have recently been developed and disclosed in technical papers. One of such improvements may comprise, for instance, providing comb teeth on salient poles of an armature core which forms a rotor.

In actual practice, forming comb teeth on the salient poles of the armature core of the rotor has been and is now being performed by die punching or etching comb teeth on thin leaves which form the core, so that the comb teeth can reduce the cogging characteristics as much as possible.

The step of laminating the thin leaves to form a core makes it difficult to mass-produce a core of a miniature motor intended to realize a so-called 37 light-weight, thin, short and miniature size" structure. Thus, it is realized that any means other than providing comb teeth on the rotor in this manner would be preferable for effectively improving the cogging characteristics of the motor.

Moreover, the stator of the rectangular rubber magnet strip, which allows for ease of the assembly process has another drawback that the non-polarized regions actually occupy about one half ($\frac{1}{2}$) of the strip's entire length, being redundant and not necessary to achieve the desired motor characteristics.

SUMMARY OF THE INVENTION

It is therefore the primary object of the present invention to provide a miniature electric motor with a stator made of rubber magnet which overcomes the above-mentioned various drawbacks and solves the problems inherent to the conventional motors.

The present invention, comprises a miniature electric motor whose stator is structured with a strip made of rubber magnet. The strip comprises polarized regions and non-polarized regions, and has varying width. The width of the polarized regions is larger than the width of non-polarized regions. More particularly, the width of the non-polarized regions is gradually tapered from the greater width of the polarized region towards the non-polarized regions having minimum width.

To reduce cogging characteristics, in the above-mentioned miniature electric motor, the polarized regions of the strip of rubber magnet may further include a plurality of discrete narrowed width zones, and the non-polarized regions may include a plurality of discrete widened width zones. The narrowed width zones may be indents provided along the periphery of the polarized regions while the widened width zones may be protrusions provided along the periphery of the non-polarized regions.

Since the width of the strip made of rubber magnet continuously varies along its lengthwise position between the polarized regions and the non-polarized regions, its magnetic flux density also varies continuously along its lengthwise position. Thus, the planar configuration of the strip may be designed so that its non-polarized regions have the minimum width for saving material and for facilitating the inserting operation.

As previously described, the miniature electric motor comprising a stator incorporating the strip is advantageous because of the easy assembly process, the simple polarizing process, the reduced cogging characteristics, the space-saving size, the effective utilization of rubber magnet, and the light weight of the finished motor.

Furthermore, the rubber magnet strip has improved flexibility as compared with the rectangular strip of the prior art miniature motor because of the narrow width of the non-polarized regions. Thus the tendency of the strip to separate from the motor housing at the joining edges is effectively reduced, and the gap or clearance between the rotor and the stator is more stable and uniform, thereby decreasing the defect rate and increasing the reliability of motor.

While the novel features of the present invention are set forth particularly in the appended claims, the invention, will be more clearly described in the following detailed description with reference to the drawings.

DETAILED DESCRIPTION OF THE INVENTION

In the following paragraphs, the present invention will be described in more detail by way of the examples shown in the attached drawings.

Figure 1B:
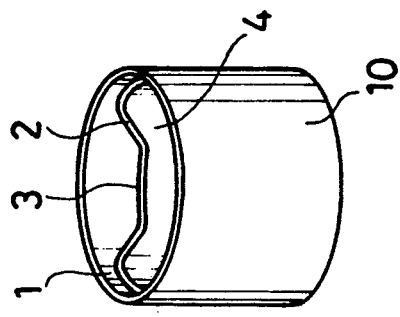
FIG. 1(b) is a perspective view showing a manner of incorporating the rubber magnet strip of FIG. 1(a) in a motor housing.
Figure 1A:
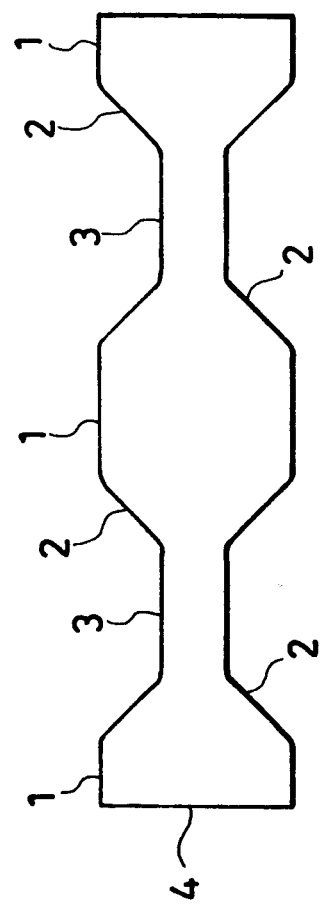
FIG. 1(a) is a plan view of an embodiment of a strip of a rubber magnet used in an electric motor of the present invention.

In FIG. 1(a), a typical configuration of a strip made of a rubber magnet 4 used in a motor built according to the present invention is shown. The rubber magnet strip 4 has polarized regions 1 with maximum width, non-polarized regions 3 with minimum width and connecting regions 2 with continuously varying width which connect the polarized regions 1 to the non-polarized regions 3. FIG. 1(b) is a perspective view illustrating how the rubber magnet strip 4 is located in a motor housing 10.

Figure 2:
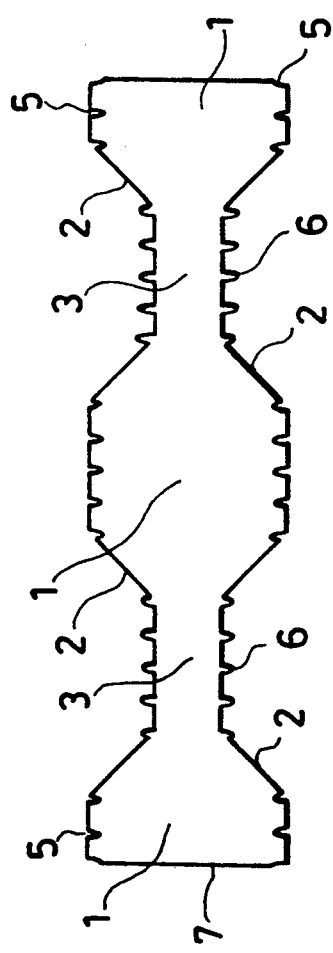
FIG. 2(a) is a plan view of another embodiment of the rubber magnet strip of the present invention.
FIG. 2(b) is a plan view showing an arrangement for efficiently cutting a number of strips from a larger piece of magnetic rubber.

In FIG. 2(a), a configuration of another example of the rubber magnet strip 7 to be used in the motor of the present invention is shown. The rubber magnet strip 7 has a planar configuration similar to that of FIG. 1(a) including polarized regions 1 with maximum width, non-polarized regions 3 with minimum width and connecting regions 2 with continuously varying width. In the exemplified rubber magnet strip, a plurality of indents 5 are provided along the periphery of the polarized regions 1 at certain given intervals in order to improve the cogging characteristics. Additionally, a plurality of protrusions 6 are provided along the periphery of the non-polarized regions 3 at certain given intervals, in order to facilitate inserting the strip into the motor housing. By providing the indents 5 and protrusions 6, the performance of the finished miniature motor is significantly enhanced.

Figure 2B:
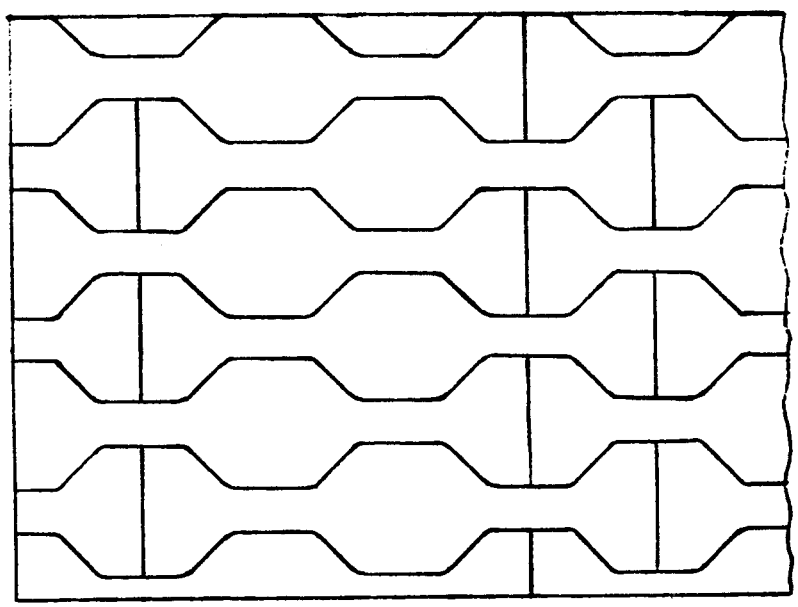
Figure 3:
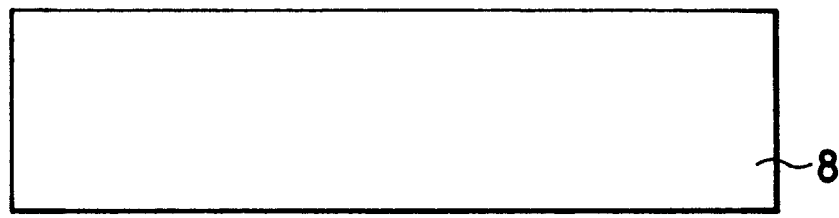
FIG. 3 is a plan view of a conventional rectangular strip made of a rubber magnet used in prior art motors.

Both embodiments of the rubber magnet strips of FIG. 1(a) and FIG. 2(a) have shapes suitable for efficient cutting when a plurality of them are cut from a larger piece of rubber magnet. By arranging them, in a manner that the maximum width parts and minimum width parts are put side by side, as shown in FIG. 2(b), cutting waste can be minimized.

The table on the next page summarizes the results of the experiments performed to confirm the superiority of the characteristics of the electric motors built according to the present invention compared to the characteristics of the conventional motor.

Figure 4A:
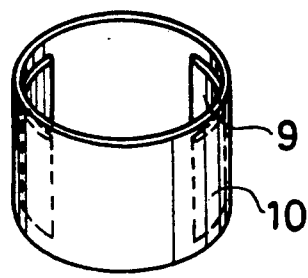
FIG. 4(a) and FIG. 4(b) are perspective views showing manners of incorporating the rubber magnet in the motor housing according to prior art.
Figure 4B:
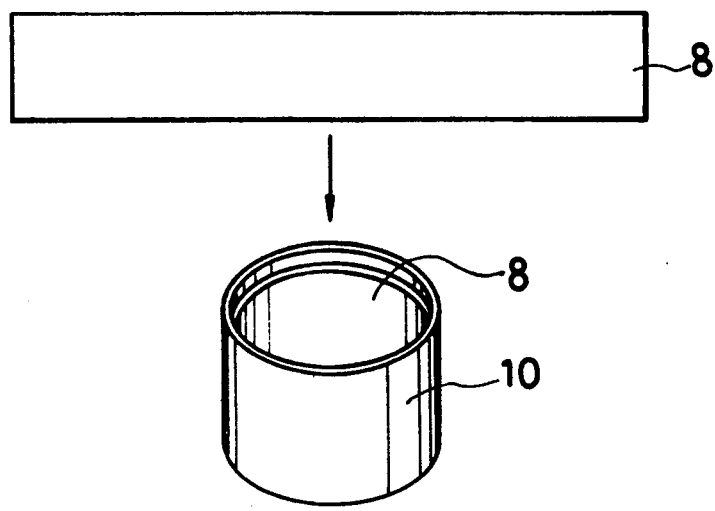

In the experiment, a miniature motor built with a conventional rectangular strip made of a rubber magnet as shown by FIG. 4(b) was used and the results are indicated in the table as Comparative Example. One motor with the rubber magnet strip including polarized regions of maximum width, bridging regions of continuously varying width and non-polarized regions of minimum width as shown by FIG. 1(a) was used and the results are indicated in the table as Working Example 1). The results of a motor provided with a stator strip having the indents 5 and protrusions 6 as shown by FIG. 2(a) are indicated in the table as Working Example 2).

These rubber magnet strips were assembled in miniature D.C. motors of:

Outer diameter; 30 mm, height; 25 mm, and
Rated output; 0.1 W.

Tests were performed under the experimental conditions of:

4.2 V D.C., 25 mA, 2400 rpm., for 2000 hrs..

TABLE

| | Cogging Characteristics | Wow/ Fluttering | Overall Evaluation |
|---|---|---|---|
| Comparative Example | Acceptable | 0.1 | Good |
| Working Example 1) | Good | 0.33 | Excellent |
| Working Example 2) | Excellent | 0.25 | Excellent |

As summarized in the above table, the results of the comparative experiment reveal that the miniature motors construed in accordance with the present invention are found to have the following advantages:

1) remarkable improvements in the cogging characteristics;

2) easy assembly process and a resulting reduction of the defect rate;

3) space-saving miniature size of the finished motor of so-called "light weight and thin, short and miniature in size" is realized; and 4) rubber magnet strips are shaped so that efficient cutting with very little cutting waste is possible when a plurality of strips are cut from a large piece of a rubber magnet.

Although the present invention has been described in its preferred form with a certain degree of particularity, it is understood that the present disclosure of the preferred form has been given only as an example, and many modifications and variations are possible without exceeding the scope of the invention as disclosed.

What is claimed is:

1. A miniature electric motor having a stator including a strip made of a rubber magnet, said strip comprising:

at least one wide width part;
at least one narrow width part;
at least one polarized region disposed on said at least one wide width part; and
at least one non-polarized region disposed on said at least one narrow width part; and continuously varying width sections which connect the polarized regions to the non-polarized regions.

2. A miniature electric motor as claimed in claim 1, wherein the polarized regions include a plurality of discrete narrowed width zones; and the non-polarized regions include a plurality of discrete widened width zones.

3. A miniature electric motor as claimed in claim 2, wherein the narrowed width zones are indents provided along a periphery of the polarized regions of the strip.

4. A miniature electric motor as claimed in claim 2, wherein the widened width zones are protrusions provided along a periphery of the non-polarized regions of the strip.

* * * * *